(12) United States Patent
Spoone

(10) Patent No.: US 9,929,546 B2
(45) Date of Patent: Mar. 27, 2018

(54) ELECTRICAL SYSTEM AND SUPPORT ASSEMBLY THEREFOR

(71) Applicant: EATON CORPORATION, Cleveland, OH (US)

(72) Inventor: Travis Vernon Spoone, Greenwood, SC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 778 days.

(21) Appl. No.: 14/505,634

(22) Filed: Oct. 3, 2014

(65) Prior Publication Data
US 2016/0099562 A1 Apr. 7, 2016

(51) Int. Cl.
*H02B 11/18* (2006.01)
*H02B 7/00* (2006.01)
*H02B 3/00* (2006.01)

(52) U.S. Cl.
CPC .............. *H02B 11/18* (2013.01); *H02B 7/00* (2013.01); *H02B 3/00* (2013.01)

(58) Field of Classification Search
CPC .......... H02B 7/00; H02B 11/12; H02B 11/18; H02B 3/00; H02J 7/22
See application file for complete search history.

(56) References Cited

U.S. PATENT DOCUMENTS

| | | | | |
|---|---|---|---|---|
| 1,929,983 A * | 10/1933 | MacNeil | ................ | H01H 31/32 361/607 |
| 2,600,304 A * | 6/1952 | Krida | ..................... | H02B 11/28 200/51.03 |
| 2,735,042 A * | 2/1956 | Hayford et al. | ...... | H02B 11/167 200/50.23 |
| 3,435,162 A * | 3/1969 | Kozlovic | ............... | H02B 11/18 200/50.21 |
| 3,896,353 A * | 7/1975 | Burton | .................. | H02B 11/133 200/50.26 |
| 3,958,156 A * | 5/1976 | Tjebben | ............... | H02B 11/167 200/50.23 |
| 4,139,748 A * | 2/1979 | Wolfe | ..................... | H02B 11/00 200/50.26 |
| 4,269,285 A * | 5/1981 | Ohkoshi | ................... | B66F 9/02 187/244 |

(Continued)

FOREIGN PATENT DOCUMENTS

| DE | 3613286 A1 * | 10/1987 | ............. H02B 13/02 |
|---|---|---|---|
| EP | 2149947 A2 * | 2/2010 | ............. H02B 11/04 |
| GB | 2007622 A * | 5/1979 | ................ B66F 9/02 |

*Primary Examiner* — Jared Fureman
*Assistant Examiner* — Christopher Clark
(74) *Attorney, Agent, or Firm* — Eckert Seamans; John Powers; Philip Levy

(57) ABSTRACT

A support assembly is for an electrical system. The electrical system includes a network protector and a number of disconnect switches coupled to the network protector. The support assembly includes: an insulative mounting member coupled to each of the disconnect switches; a number of base assemblies each including a housing assembly and a stand assembly disposed on the housing assembly, the housing assembly being coupled to the insulative mounting member; and a lifting apparatus disposed on each of the base assemblies. The lifting apparatus moves each of the insulative mounting member and the housing assembly in a direction transverse to the stand assembly.

20 Claims, 4 Drawing Sheets

(56) References Cited

U.S. PATENT DOCUMENTS

| | | | | |
|---|---|---|---|---|
| 4,477,701 | A * | 10/1984 | Castonguay | H02B 11/00 200/50.27 |
| 4,752,859 | A * | 6/1988 | Chabala | H01H 33/02 200/48 R |
| 5,434,369 | A * | 7/1995 | Tempco | H02B 11/10 200/50.26 |
| 5,486,978 | A * | 1/1996 | Fishovitz | H02B 11/24 200/50.21 |
| 5,861,682 | A * | 1/1999 | Sakai | H02B 1/24 307/11 |
| 5,889,248 | A * | 3/1999 | Plettner | H01H 33/125 218/14 |
| 5,906,508 | A * | 5/1999 | Jeffcoat | H01H 9/085 200/308 |
| 6,630,638 | B1 * | 10/2003 | Freeman | H02B 5/06 200/50.21 |
| 7,781,689 | B2 | 8/2010 | Jur et al. | |
| 7,927,155 | B2 * | 4/2011 | Mittu | H02B 11/04 200/50.26 |
| 9,368,947 | B2 * | 6/2016 | Yee | |
| 2010/0072175 | A1 * | 3/2010 | Stenzel | H01H 31/003 218/89 |
| 2012/0228098 | A1 * | 9/2012 | Pai | H02B 11/127 200/50.27 |
| 2014/0192454 | A1 * | 7/2014 | Ashmore | H02B 5/00 361/602 |
| 2014/0247542 | A1 * | 9/2014 | Fong | E04H 12/08 361/679.01 |

* cited by examiner

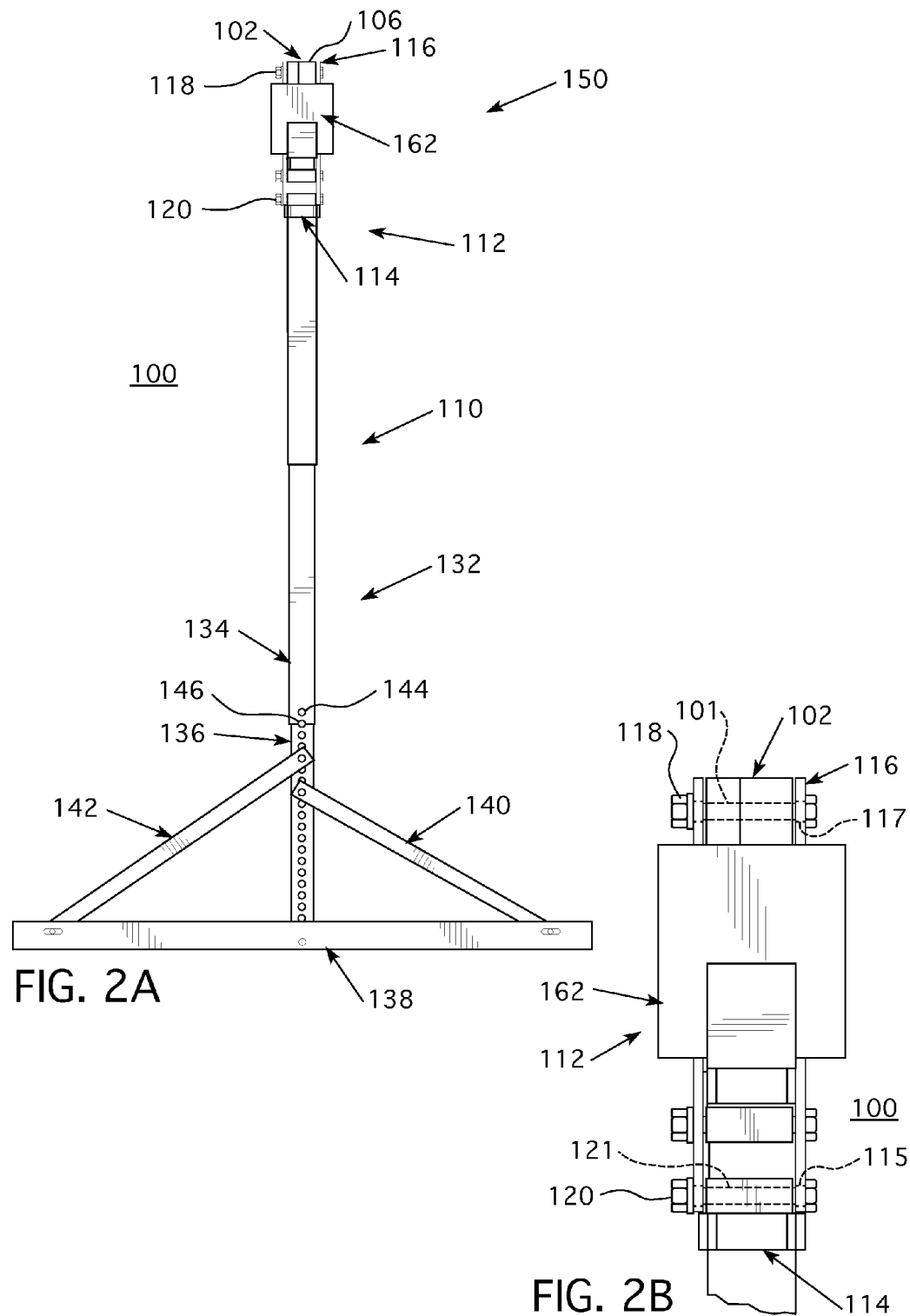

ELECTRICAL SYSTEM AND SUPPORT ASSEMBLY THEREFOR

BACKGROUND

Field

The disclosed concept pertains generally to electrical systems and, more particularly, to electrical systems including network protectors. The disclosed concept also pertains to support assemblies for electrical systems.

Background Information

Low voltage secondary power distribution networks consist of interlaced loops or grids supplied by two or more sources of power, in order that the loss of any one source will not result in an interruption of power. Such networks provide the highest possible level of reliability with conventional power distribution and are, normally, used to supply high-density load areas, such as a section of a city, a large building or an industrial site.

Each source supplying the network is typically a medium voltage feeder including a switch, a voltage reducing transformer and a network protector. As is well-known, a network protector is an apparatus used to control the flow of electrical power to a distribution network. The network protector includes a low voltage circuit breaker and a control relay which opens the circuit to the transformer upon detection of abnormal current flow. Additionally, typically coupled to the network protector are a number of low profile disconnect switches intended to isolate the network protector from an energized bus. To remove the network protector from its associated transformer, the disconnect switches must either be unbolted from the network protector or the energized bus, both of which require manual support and present safety challenges.

There is thus room for improvement in electrical systems and in support assemblies therefor.

SUMMARY

These needs and others are met by embodiments of the disclosed concept which are directed to a support assembly, which among other benefits, safely and reliably allows a number of disconnect switches to be installed on and removed from an electrical system, including for example a network protector.

In accordance with one aspect of the disclosed concept, a support assembly for an electrical system is provided. The electrical system includes a network protector and a number of disconnect switches coupled to the network protector. The support assembly comprises: an insulative mounting member coupled to each of the disconnect switches; a number of base assemblies each comprising a housing assembly and a stand assembly disposed on the housing assembly, the housing assembly being coupled to the insulative mounting member; and a lifting apparatus disposed on each of the base assemblies. The lifting apparatus moves each of the insulative mounting member and the housing assembly in a direction transverse to the stand assembly.

As another aspect of the disclosed concept, an electrical system comprises: a network protector; a number of disconnect switches coupled to the network protector; and a support assembly comprising: an insulative mounting member coupled to each of the disconnect switches, a number of base assemblies each comprising a housing assembly and a stand assembly disposed on the housing assembly, the housing assembly being coupled to the insulative mounting member, and a lifting apparatus disposed on each of the base assemblies. The lifting apparatus moves each of the insulative mounting member and the housing assembly in a direction transverse to the stand assembly.

BRIEF DESCRIPTION OF THE DRAWINGS

A full understanding of the disclosed concept can be gained from the following description of the preferred embodiments when read in conjunction with the accompanying drawings in which:

FIG. 2A is a side elevation view of the support assembly of FIG. 1;

FIG. 2B is an enlarged view of a portion of the support assembly of FIG. 2A;

DESCRIPTION OF THE PREFERRED EMBODIMENTS

Figure 1:
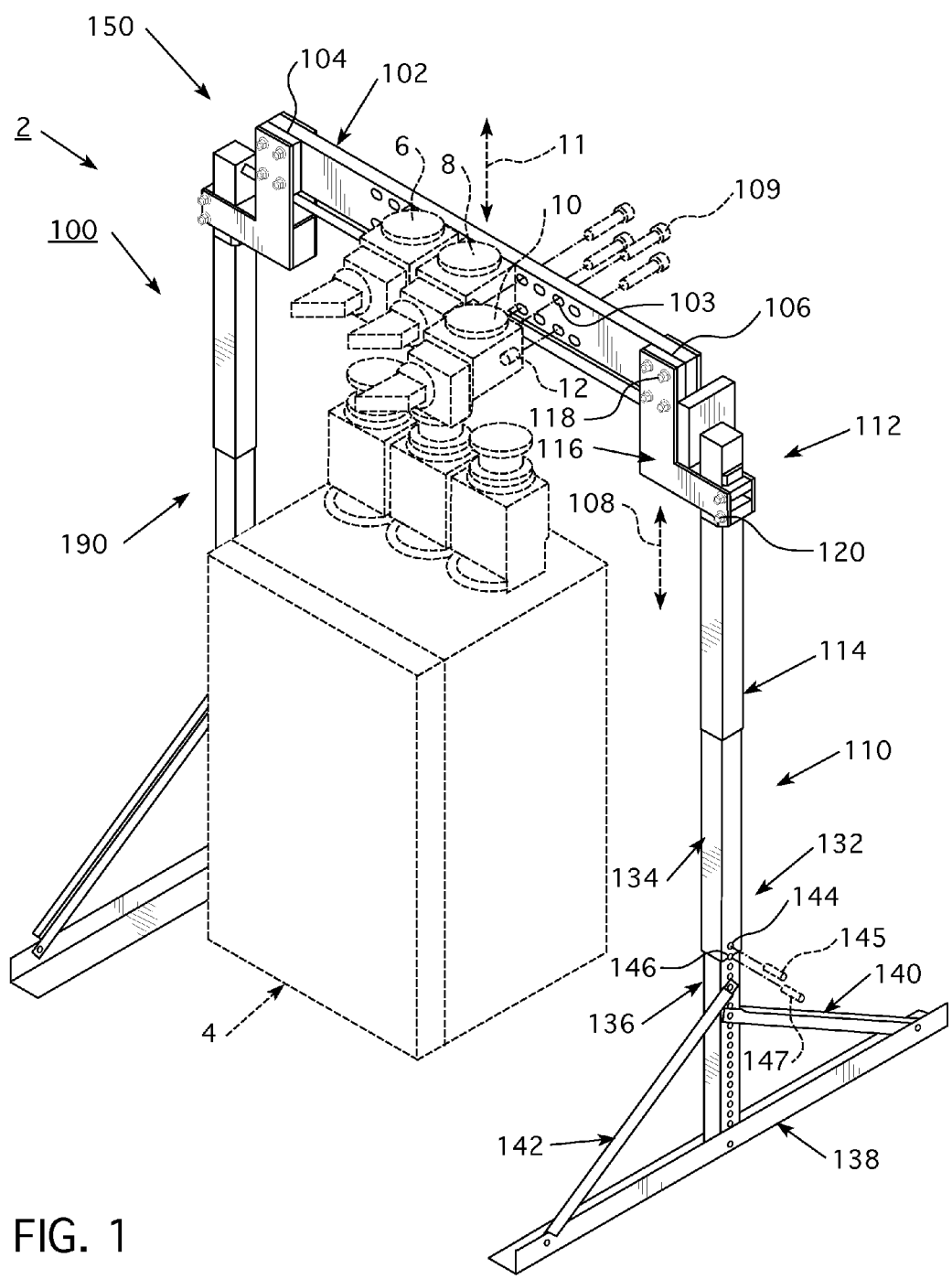
FIG. 1 is a simplified, partially exploded isometric view of an electrical system, and a support assembly therefor, in accordance with the disclosed concept.

For purposes of the description hereinafter, directional phrases used herein such as, for example "up", "down", "top", "bottom", and derivatives thereof shall relate to the disclosed concept, as it is oriented in the drawings. It is to be understood that the specific elements illustrated in the drawings and described in the following specification are simply exemplary embodiments of the disclosed concept. Therefore, specific orientations and other physical characteristics related to the embodiments disclosed herein are not to be considered limiting with respect to the scope of the disclosed concept.

As employed herein, the term "number" shall mean one or an integer greater than one (i.e., a plurality).

As employed herein, the phrase "direction transverse" shall mean to move toward or away from a component or assembly.

As employed herein, the term "coupling member" refers to any suitable connecting or tightening mechanism expressly including, but not limited to, rivets, screws, bolts and the combinations of bolts and nuts (e.g., without limitation, lock nuts) and bolts, washers and nuts.

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

FIG. 1 shows an example electrical system 2 in accordance with the disclosed concept. The electrical system 2 includes a network protector 4 (shown in simplified form in dashed line) and a number of disconnect switches 6,8,10 (each shown in simplified form in dashed line, and the disconnect switch 10 being partially exploded). For purposes of disclosure that will be discussed below, the disconnect switches 6,8,10 are illustrated as being separated from the network protector 4. However, it will be appreciated that when the network protector 4 is operational, each of the disconnect switches 6,8,10 is coupled to the network protector 4. The electrical system 2 further includes a support assembly 100 that allows the disconnect switches 6,8,10 to be supported, such as, for example, during installation and removal. In this manner, when the disconnect switches 6,8,10 are not coupled to the network protector 4, as shown in FIG. 1, the network protector 4 can advantageously be removed from its associated transformer (not shown). As will be discussed below, the support assembly 100 provides a safe and reliable mechanism to remove/install the disconnect switches 6,8,10 from the network protector 4.

In order to isolate any current present in the disconnect switches 6,8,10, and still provide a suitable support mechanism, the support assembly 100 includes an insulative mounting member 102 and a number of base assemblies 110,190, each coupled to a respective end portion 104,106 of the insulative mounting member 102. The network protector 4 is located between the base assemblies 110,190. Additionally, although two base assemblies 110,190 are shown and indicated, for ease of illustration and economy of disclosure, only the base assembly 110 will be described in detail herein. It will however be appreciated that the structure of the base assembly 190 is preferably substantially the same as the structure of the base assembly 110.

As shown in FIG. 1, the insulative mounting member 102 includes a number of thru holes (a plurality are shown, but only one thru hole 103 is indicated) and the support assembly 100 further includes a number of coupling members (four are shown, but only one coupling member 109 (shown in simplified form in dashed line) is indicated). Additionally, each of the disconnect switches 6,8,10 includes a corresponding number of apertures (only one aperture 12 (shown in simplified form in hidden line drawing in FIG. 1) is indicated). In this manner, the coupling members 109 extend through the respective thru holes 103 of the insulative mounting member 102 and through the respective apertures 12 of the disconnect switches 6,8,10 in order to couple the disconnect switches 6,8,10 to the insulative mounting member 102. It will be understood that the disconnect switches 6,8,10 advantageously require no modification in order to receive the coupling members 109. Stated differently, the same apertures 12 of the disconnect switches 6,8,10 that, for example enable the disconnect switches to mount to wall (not shown), advantageously receive the coupling members 109. Additionally, because the mounting member 102 is made of an insulative material, when the disconnect switches 6,8,10 are coupled to the insulative mounting member 102, current cannot reach the base assemblies 110,190. In this manner, the support assembly 100 provides a safe mechanism to manipulate the disconnect switches 6,8,10, and thus allow the network protector 4 to be removed from its associated transformer (not shown).

As shown in FIG. 2A, the base assembly 110 includes a housing assembly 112 and a stand assembly 132 located on the housing assembly 112. Referring to FIG. 2B, the housing assembly 112 has a sliding housing member 114, a coupling housing member 116, and a number of fasteners (only fasteners 118,120 are indicated). The insulative mounting member 102 has a number of thru holes (only thru hole 101 (shown in simplified form in hidden line drawing) is shown). The sliding housing member 114 has a number of thru holes (only thru hole 121 (shown in simplified form in hidden line drawing) is shown). The coupling housing member 116 has a number of thru holes (only thru holes 115,117 (shown in simplified form in hidden line drawing) are shown). The fastener 118 extends through the thru holes 101,117 in order to advantageously fasten the coupling housing member 116 to the insulative mounting member 102. Likewise, the fastener 120 extends through the thru holes 115,121 in order to advantageously fasten the coupling housing member 116 to the sliding housing member 114. Thus, the coupling housing member 116 advantageously couples the sliding housing member 114 to the insulative mounting member 102.

Referring again to FIG. 2A, the stand assembly 132 includes a number of stand members (three stand members 134,136,138 are shown) and a number of brace members (two brace members 140,142 are shown). The stand member 134 extends into the sliding housing member 114. The stand members 134,136 are elongated in a direction collinear with the sliding housing member 114 and with each other. Furthermore, the stand member 134 is coupled to the stand member 136. The stand member 138 is coupled to the stand member 136 and is elongated in a direction normal to the stand members 134,136. The brace members 140,142 are coupled to each of the stand members 136,138 and advantageously stabilize the base assembly 110. It will be appreciated with reference to FIG. 1 that the stand member 138 is elongated in a direction parallel to the corresponding stand member of the base assembly 190, advantageously providing stability to the support assembly 100. Furthermore, the insulative mounting member 102 is elongated in a direction normal to the stand member 134 and the corresponding stand member on the base assembly 190, advantageously allowing weight associated with the disconnect switches 6,8,10 (FIG. 1) to be evenly distributed in the base assemblies 110,190.

As shown in FIG. 1, the stand member 134 has a thru hole 144 and a notch 146. The thru hole 144 is aligned with a corresponding thru hole of the stand member 136. The notch 146 is half-circle shaped and is aligned with another corresponding thru hole of the stand member 136. Additionally, the stand assembly 132 further includes a number of coupling members 145,147 (shown exploded, in simplified form in dashed line). In operation, either one of, or both of the coupling members 145,147 extend through the respective thru hole 144 and the notch 146, and through the stand member 136 in order to advantageously couple the stand members 134,136 to each other. By employing the thru hole 144, the notch 146, and the coupling members 145,147, the stand member 134 is removably coupled to the stand member 136 such that the height of the support assembly 100 may quickly and advantageously be adjusted. Stated differently, when the coupling members 145,147 are removed (i.e., by an operator), the stand members 134,136 may move to a different position with respect to each other, and then the coupling members 145,147 reinserted through the thru hole 144, the notch 146, and the stand member 136 in order to couple the stand member 134 to the stand member 136.

Figure 3A:
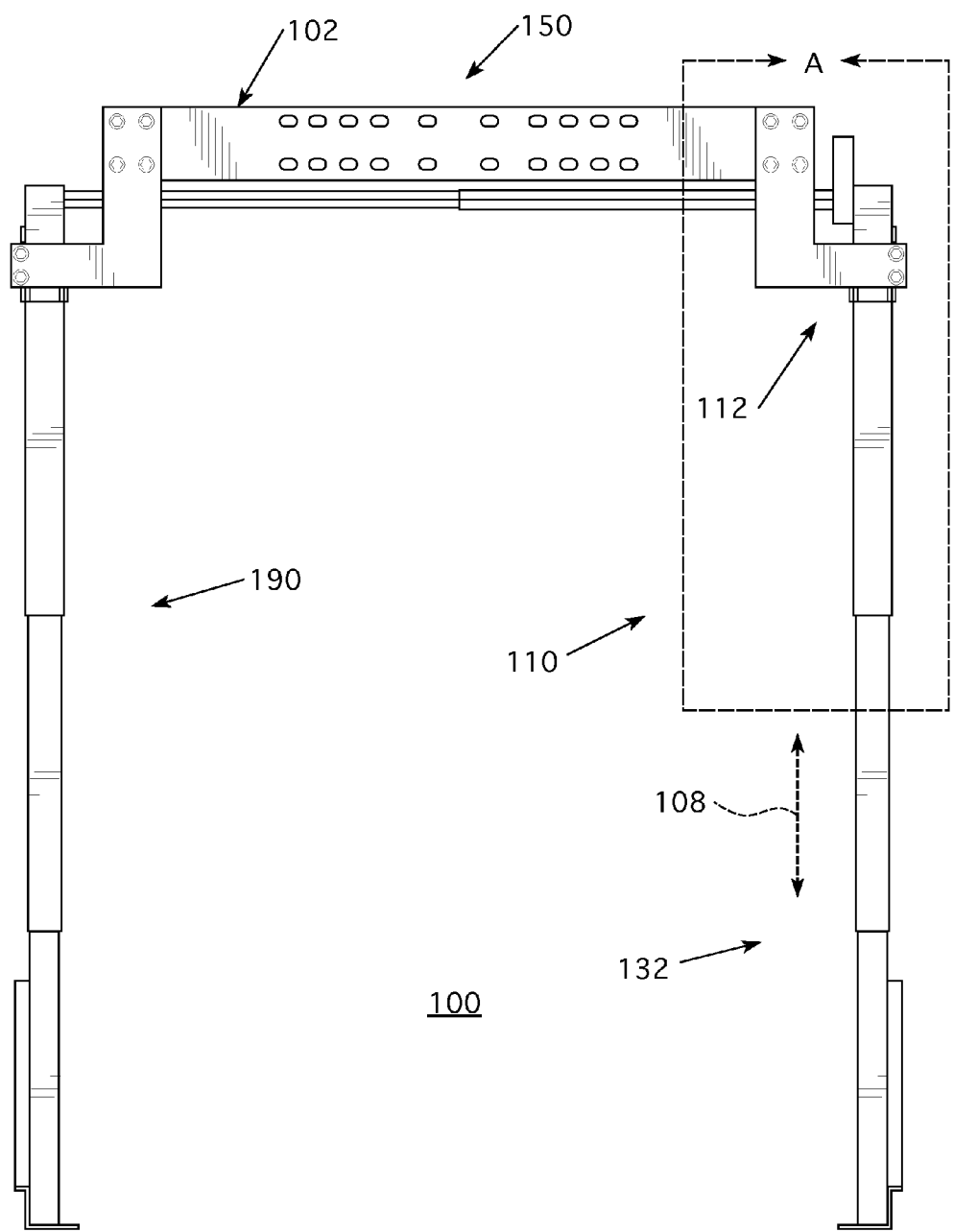
FIG. 3A is a front elevation view of the support assembly.
Figure 3B:
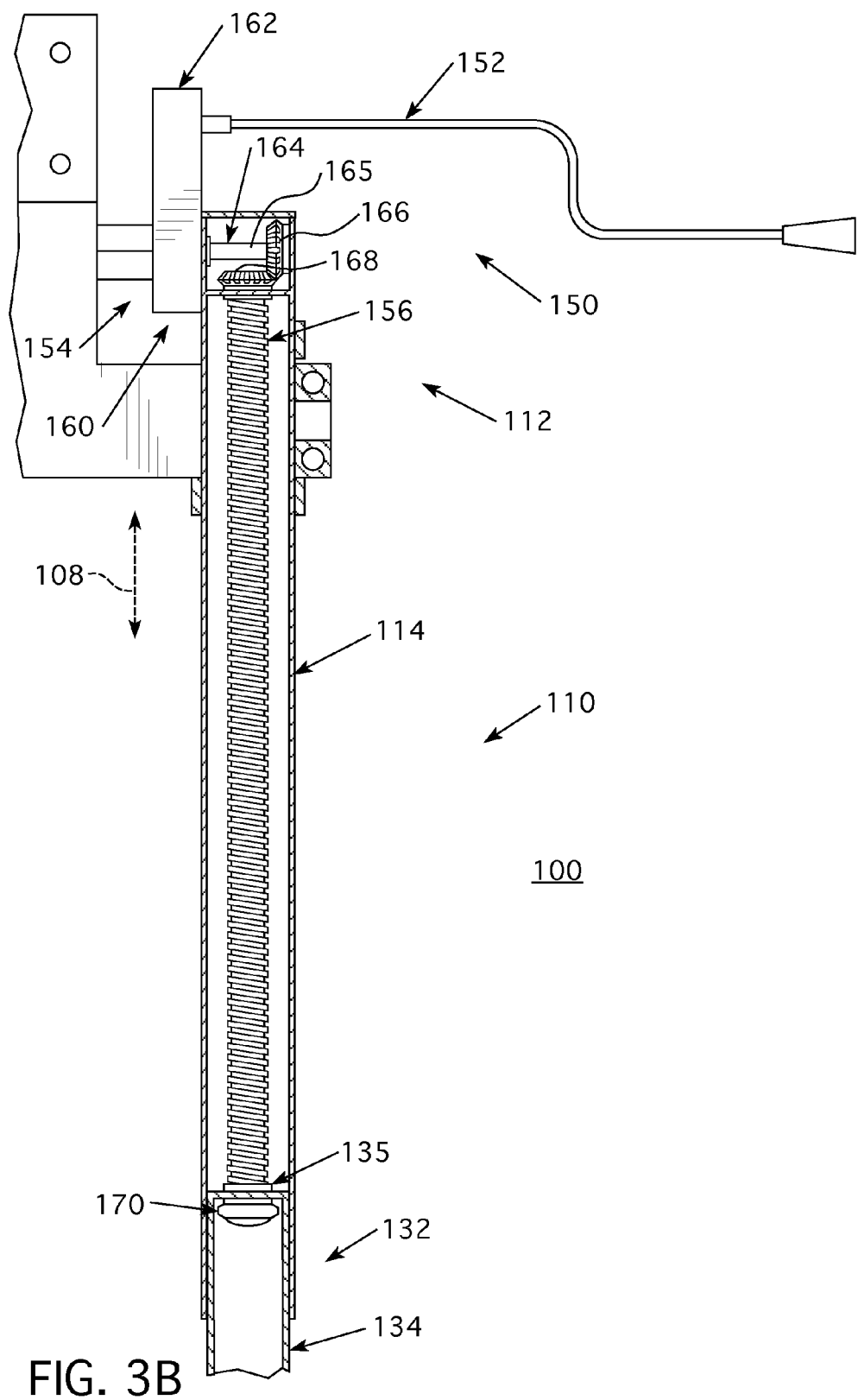
FIG. 3B is an enlarged section view, taken along section cut A of FIG. 3A.

Referring to FIGS. 3A and 3B, in order to manipulate the disconnect switches 6,8,10 (FIG. 1), the support assembly 100 further includes a lifting apparatus 150 located on each of the base assemblies 110,190. When the disconnect switches 6,8,10 (FIG. 1) are coupled to the insulative mounting member 102, the lifting apparatus 150 provides a suitable mechanism to move the insulative mounting member 102 and the housing assembly 112 in a direction 108 transverse to the stand assembly 132. In other words, in the example described herein, the housing assembly 112 may move toward (i.e., down with respect to) the stand assembly 132 or may move away from (i.e., up with respect to) the stand assembly 132. That is, while the stand assembly 132 remains substantially fixed, the housing assembly 112 and the insulative mounting member 102 (i.e., and thus the disconnect switches 6,8,10 (FIG. 1)) move up and down. It will be appreciated that when the housing assembly 112 moves in the direction 108, the housing assembly of the base assembly 190 moves in a direction parallel to the direction 108. Stated differently, the housing assemblies 112 (and the corresponding housing assembly of the base assembly 190) and the insulative mounting member 102 move up and down together in order to allow the disconnect switches 6,8,10 (FIG. 1) to separate from and/or be coupled to the network protector 4 (FIG. 1).

The lifting apparatus 150 may be powered manually, as will be described below, or by any other suitable alternative mechanism (not shown). Alternatively, the lifting apparatus 150 could be automatically operated or powered, for example and without limitation, by a suitable number of electrical motors (not shown). As shown in FIG. 3B, the lifting apparatus 150 includes a powering mechanism (e.g., without limitation, handle 152) and a transfer assembly 154. For economy of disclosure, the handle 152 has only been illustrated with the support assembly 100 in FIG. 3B. The transfer assembly 154 has a gear assembly 160 and a lead screw 156 that is located in the sliding housing member 114. In operation, the gear assembly 160 and the lead screw 156 each cooperate with the handle 152 to move the insulative mounting member 102 and the housing assembly 112 in the direction 108 transverse to the stand assembly 132 (e.g., to move the mounting member 102 and the housing assembly 112 down, or toward the network protector 4, from the perspective of FIG. 1).

The gear assembly 160 includes a gearbox 162, a shaft 164, and a plurality of bevel gears 166,168. The gearbox 162 engages the sliding housing member 114. The handle 152 extends into and cooperates with the gearbox 162. The shaft 164 extends through and cooperates with the gearbox 162. The shaft 164 also includes a distal portion 165 that is located in the sliding housing member 114 and is coupled to the bevel gear 166. The bevel gear 168 is coupled to the lead screw 156 and cooperates with the bevel gear 166. Thus, it will be appreciated that when the handle 152 drives the gearbox 162, the shaft 164 rotates, and because of the bevel gears 166,168, the lead screw 156 rotates. In other words, rotation of the handle 152 (i.e., by an operator) advantageously causes the lead screw 156 to rotate to effectuate desired movement of the support assembly 100.

In order for the lead screw 156 to cause movement of the housing assembly 112 and the insulative mounting member 102 (i.e., and thus the disconnect switches 6,8,10 (FIG. 1)), the stand assembly 132 advantageously includes a threaded bushing 135 that is coupled to the stand member 134. The lead screw 156 threadably engages the threaded bushing 135. Additionally, the lifting apparatus 150 preferably further includes a stopper 170 that is coupled to the lead screw 156. The stopper 170 prevents the lead screw 156 from disengaging the threaded bushing 135. As shown in FIG. 3B, the stopper 170 is engaging the threaded bushing 135. When the support assembly 100 is in this position, and the disconnect switches 6,8,10 (FIG. 1) are coupled to the insulative mounting member 102, the disconnect switches 6,8,10 (FIG. 1) are spaced from the network protector 4, as shown in FIG. 1. When the lead screw 156 begins to rotate (i.e., a motion caused by rotation of the handle 152), the lead screw 156 moves through the threaded bushing 135 (i.e., moves down). When this happens and when the disconnect switches 6,8,10 (FIG. 1) are coupled to the insulative mounting member 102, the disconnect switches 6,8,10 (FIG. 1) advantageously move toward the network protector 4, thereby allowing an operator to couple them to the network protector 4 (FIG. 1). It follows that when the lifting apparatus 150 moves the insulative mounting member 102 and the housing assembly 112 in the direction 108, the disconnect switches 6,8,10 (FIG. 1) move in a direction 11 (FIG. 1) transverse (e.g., move down from the perspective of FIG. 1) toward the network protector 4. The direction 11 (FIG. 1) is parallel to the direction 108.

It will be appreciated that the lifting apparatus 150 is located on the base assembly 190 in the same manner as the base assembly 110. More specifically, the shaft 164, which is elongated in a direction parallel to the insulative mounting member 102, has another distal portion (not shown), one that extends into the sliding housing member of the base assembly 190. The transfer assembly 154 further includes another corresponding lead screw (not shown), the gear assembly 160 further includes another pair of bevel gears (not shown), and the stand assembly of the base assembly 190 includes a threaded bushing (not shown). Furthermore, the lifting apparatus 150 includes a second stopper (not shown) located within the housing assembly of the base assembly 190. Thus, when the shaft 164 rotates (i.e., responsive to the handle 152 cooperating with the gearbox 162), the lead screw 156 and the lead screw located in the sliding housing member of the base assembly 190 each rotate and threadably move through their respective threaded bushings 135 (and the threaded bushing of the base assembly 190) at equal speeds. In this manner, the insulative mounting member 102 and the respective housing assemblies 112 (and the housing assembly of the base assembly 190) are advantageously able to move toward and move away from their respective stand assemblies 132 (and the stand assembly of the base assembly 190) at equal speeds.

Accordingly, it will be appreciated that the disclosed concept provides for an improved (e.g., without limitation, safer, easier to manipulate) electrical system 2 and support assembly 100 therefor, which among other benefits, provides an insulative mounting member 102, a number of base assemblies 110,190, and a lifting apparatus 150 that cooperate to safely and reliably allow a number of disconnect switches 6,8,10 to be installed and removed from a network protector 4. In this manner, manual interaction with the disconnect switches 6,8,10 is reduced, and the network protector 4 is advantageously able to be removed from its associated transformer (not shown).

Although the disclosed concept has been described in association with the base assemblies 110,190 and the associated lifting apparatus 150, it is within the scope of the disclosed concept to employ any alternative lifting apparatus (not shown) and/or base assemblies (not shown) having any suitable alternative configurations and interactions with each other in order to perform the desired function of moving the insulative mounting member 102 up and down with respect to the network protector 4.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A support assembly for an electrical system, said electrical system comprising a network protector and a number of disconnect switches coupled to said network protector, said support assembly comprising:

an insulative mounting member structured to be coupled to each of said number of disconnect switches;
a number of base assemblies each comprising a housing assembly and a stand assembly extending into said housing assembly, said housing assembly being coupled to said insulative mounting member; and
a lifting apparatus disposed on each of said base assemblies,
wherein said lifting apparatus is structured to move each of said insulative mounting member and said housing assembly in a direction orthogonal to a plane said stand assembly rests on.

2. The support assembly of claim 1 wherein said housing assembly comprises a sliding housing member and a coupling housing member; wherein said coupling housing member couples said insulative mounting member to said sliding housing member; and wherein said stand assembly extends into said sliding housing member.

3. The support assembly of claim 2 wherein said insulative mounting member comprises a first end portion and a second end portion opposite the first end portion; wherein said number of base assemblies comprises a first base assembly and a second base assembly; wherein said coupling housing member of said first base assembly is fastened to the first end portion; and wherein said coupling housing member of said second base assembly is fastened to the second end portion.

4. The support assembly of claim 3 wherein said lifting apparatus comprises a transfer assembly and a powering mechanism; wherein said transfer assembly comprises a gear assembly, a first lead screw, and a second lead screw; wherein said first lead screw is disposed within said sliding housing member of said first base assembly; wherein said second lead screw is disposed within said sliding housing member of said second base assembly; and wherein each of said gear assembly, said first lead screw, and said second lead screw is structured to cooperate with said powering mechanism.

5. The support assembly of claim 4 wherein said gear assembly comprises a gearbox, a shaft, and a plurality of bevel gears; wherein said gearbox engages said sliding housing member of said first base assembly; wherein said shaft extends through and cooperates with said gearbox; wherein said shaft comprises a first distal portion and a second distal portion opposite the first distal portion; wherein the first distal portion is disposed in said sliding housing member of said first base assembly; wherein the second distal portion is disposed in said sliding housing member of said second base assembly; wherein said plurality of bevel gears comprises a first bevel gear, a second bevel gear, a third bevel gear, and a fourth bevel gear; wherein said first bevel gear is coupled to the first distal portion; wherein said second bevel gear is coupled to said first lead screw; wherein said third bevel gear is coupled to the second distal portion; wherein said fourth bevel gear is coupled to said second lead screw; wherein said first bevel gear cooperates with said second bevel gear; wherein said third bevel gear cooperates with said fourth bevel gear; and wherein said powering mechanism is structured to cooperate with said gear box in order to rotate each of said shaft, said first lead screw, and said second lead screw.

6. The support assembly of claim 4 wherein said stand assembly of said first base assembly comprises a first threaded bushing and a first stand member; wherein said first stand member extends into the respective sliding housing member; wherein said stand assembly of said second base assembly comprises a second threaded bushing and a second stand member; wherein said second stand member extends into the respective sliding housing member; wherein said first threaded bushing is coupled to said first stand member; wherein said second threaded bushing is coupled to said second stand member; wherein said first lead screw is structured to threadably move through said first threaded bushing at a first speed; and wherein said second lead screw is structured to threadably move through said second threaded bushing at a second speed equal to the first speed.

7. The support assembly of claim 6 wherein said lifting apparatus further comprises a first stopper and a second stopper; wherein said first stopper is coupled to said first lead screw; wherein said second stopper is coupled to said second lead screw; wherein said first stopper is structured to engage said first threaded bushing, thereby preventing said first lead screw from disengaging said first threaded bushing; and wherein said second stopper is structured to engage said second threaded bushing, thereby preventing said second lead screw from disengaging said second threaded bushing.

8. The support assembly of claim 1 wherein said housing assembly comprises a sliding housing member and a coupling housing member; wherein said coupling housing member couples said insulative mounting member to said sliding housing member; wherein said stand assembly comprises a first stand member, a second stand member, a third stand member, and a number of brace members; wherein said first stand member extends into said sliding housing member and is elongated in a direction collinear with said sliding housing member; wherein said second stand member is removably coupled to said first stand member and is elongated in a direction collinear with said first stand member; wherein said third stand member is coupled to said second stand member and is elongated in a direction normal to each of said first stand member and said second stand member; and wherein each of said number of brace members is coupled to each of said second stand member and said third stand member.

9. The support assembly of claim 8 wherein said number of base assemblies comprises a first base assembly and a second base assembly opposite said first base assembly; wherein said third stand member of said first base assembly is elongated in a direction parallel to said third stand member of said second base assembly; and wherein said insulative mounting member is elongated in a direction normal to each of said first stand member of said first base assembly and said first stand member of said second base assembly.

10. The support assembly of claim 1 wherein said housing assembly comprises a plurality of fasteners, a sliding housing member, and a coupling housing member; wherein said coupling housing member couples said insulative mounting member to said sliding housing member; wherein said coupling housing member has a plurality of thru holes; wherein said insulative mounting member has a number of thru holes; wherein said sliding housing member has a number of thru holes; wherein a number of said plurality of fasteners extend through a number of the thru holes of said coupling housing member and through the number of the thru holes of said insulative mounting member in order to fasten said coupling housing member to said insulative mounting member; and wherein another number of said plurality of fasteners extend through another number of the thru holes of said coupling housing member and through the number of the thru holes of said sliding housing member in order to fasten said coupling housing member to said sliding housing member.

11. An electrical system comprising:
a network protector;

a number of disconnect switches coupled to said network protector; and a support assembly comprising:
an insulative mounting member coupled to each of said number of disconnect switches,
a number of base assemblies each comprising a housing assembly and a stand assembly extending into said housing assembly, said housing assembly being coupled to said insulative mounting member, and
a lifting apparatus disposed on each of said base assemblies,
wherein said lifting apparatus is structured to move each of said insulative mounting member and said housing assembly in a direction orthogonal to a plane said stand assembly rests on.

12. The electrical system of claim 11 wherein said number of base assemblies comprises a first base assembly and a second base assembly opposite said first base assembly; and wherein said network protector is disposed between said first base assembly and said second base assembly.

13. The electrical system of claim 11 wherein said support assembly further comprises a number of coupling members; wherein said insulative mounting member has a number of thru holes; wherein each of said number of disconnect switches has a number of apertures; wherein each of said number of coupling members extends through a corresponding one of the thru holes and into a corresponding one of the apertures in order to couple a corresponding one of said disconnect switches to said insulative mounting member.

14. The electrical system of claim 11 wherein, when said lifting apparatus moves each of said insulative mounting member and said housing assembly in the direction orthogonal to said plane said stand assembly rests on, each of said disconnect switches moves in another direction, the another direction being parallel to the direction.

15. The electrical system of claim 14 wherein the another direction is orthogonal to a plane said network protector rests on.

16. The electrical system of claim 11 wherein said housing assembly comprises a sliding housing member and a coupling housing member; wherein said coupling housing member couples said insulative mounting member to said sliding housing member; and wherein said stand assembly extends into said sliding housing member.

17. The electrical system of claim 16 wherein said insulative mounting member comprises a first end portion and a second end portion opposite the first end portion; wherein said number of base assemblies comprises a first base assembly and a second base assembly; wherein said coupling housing member of said first base assembly is coupled to the first end portion; and wherein said coupling housing member of said second base assembly is coupled to the second end portion.

18. The electrical system of claim 17 wherein said lifting apparatus comprises a transfer assembly and a powering mechanism; wherein said transfer assembly comprises a gear assembly, a first lead screw, and a second lead screw; wherein said first lead screw is disposed within said sliding housing member of said first base assembly; wherein said second lead screw is disposed within said sliding housing member of said second base assembly; and wherein each of said gear assembly, said first lead screw, and said second lead screw is structured to cooperate with said powering mechanism.

19. The electrical system of claim 18 wherein said gear assembly comprises a gearbox, a shaft, and a plurality of bevel gears; wherein said gearbox engages said sliding housing member of said first base assembly; wherein said shaft extends through and cooperates with said gearbox; wherein said shaft comprises a first distal portion and a second distal portion opposite the first distal portion; wherein the first distal portion is disposed in said sliding housing member of said first base assembly; wherein the second distal portion is disposed in said sliding housing member of said second base assembly; wherein said plurality of bevel gears comprises a first bevel gear, a second bevel gear, a third bevel gear, and a fourth bevel gear; wherein said first bevel gear is coupled to the first distal portion; wherein said second bevel gear is coupled to said first lead screw; wherein said third bevel gear is coupled to the second distal portion; wherein said fourth bevel gear is coupled to said second lead screw; wherein said first bevel gear cooperates with said second bevel gear; wherein said third bevel gear cooperates with said fourth bevel gear; and wherein said powering mechanism is structured to cooperate with said gear box in order to rotate each of said shaft, said first lead screw, and said second lead screw.

20. The electrical system of claim 18 wherein said stand assembly of said first base assembly comprises a first threaded bushing and a first stand member; wherein said first stand member extends into the respective sliding housing member; wherein said stand assembly of said second base assembly comprises a second threaded bushing and a second stand member; wherein said second stand member extends into the respective sliding housing member; wherein said first threaded bushing is coupled to said first stand member; wherein said second threaded bushing is coupled to said second stand member; wherein, when said lifting apparatus moves each of said insulative mounting member, said housing assembly of said first base assembly, and said housing assembly of said second base assembly in the direction orthogonal to said plane said stand assembly rests on, said first lead screw threadably moves through said first threaded bushing at a first speed, and said second lead screw threadably moves through said second threaded bushing at a second speed equal to the first speed; wherein said lifting apparatus further comprises a first stopper and a second stopper; wherein said first stopper is coupled to said first lead screw; wherein said second stopper is coupled to said second lead screw; wherein said first stopper is structured to engage said first threaded bushing, thereby preventing said first lead screw from disengaging said first threaded bushing; and wherein said second stopper is structured to engage said second threaded bushing, thereby preventing said second lead screw from disengaging said second threaded bushing.

* * * * *